US012597101B2

(12) United States Patent
Yajima

(10) Patent No.: US 12,597,101 B2
(45) Date of Patent: Apr. 7, 2026

(54) IMAGE TRANSMISSION SYSTEM, IMAGE TRANSMISSION METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventor: Shunsuke Yajima, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 18/606,431

(22) Filed: Mar. 15, 2024

(65) Prior Publication Data

US 2024/0320795 A1     Sep. 26, 2024

(30) Foreign Application Priority Data

Mar. 20, 2023    (JP) ................................. 2023-044024

(51) Int. Cl.
*G06T 5/50*          (2006.01)
(52) U.S. Cl.
CPC ...... *G06T 5/50* (2013.01); *G06T 2207/20221* (2013.01); *G06T 2207/30252* (2013.01)

(58) Field of Classification Search
None
See application file for complete search history.

(56) References Cited

U.S. PATENT DOCUMENTS

2015/0356735 A1 *  12/2015  Shimizu .................. G06F 18/22
                                                                  348/148
2024/0221132 A1 *  7/2024  Kerofsky .................. G06T 7/60

FOREIGN PATENT DOCUMENTS

JP          2008-027097 A      2/2008
JP          2011-221686 A      11/2011
JP          2022-104107 A      7/2022

* cited by examiner

*Primary Examiner* — Robert J Craddock
(74) *Attorney, Agent, or Firm* — Dinsmore & Shohl LLP

(57)          ABSTRACT
The present disclosure relates to an image transmission system including a plurality of cameras and a communication device including processing circuitry. The processing circuitry is configured to execute the following processes. The first process is sequentially acquiring captured image data from each of the plurality of cameras. The second process is generating composite image data by combining the captured image data last acquired from each of the plurality of cameras, each time acquiring the captured image data from a main camera that is one of the plurality of cameras. The third process is transmitting the composite image data to a target terminal.

8 Claims, 9 Drawing Sheets

IMAGE TRANSMISSION SYSTEM, IMAGE TRANSMISSION METHOD, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2023-044024, filed on Mar. 20, 2023, the contents of which application are incorporated herein by reference in their entirety.

BACKGROUND

Field

The present disclosure relates to a technique for combining a plurality of pieces of image data and transmitting the combined data to a remote place.

Background Art

JP2011-221686A discloses a technique for wirelessly transmitting an image of surroundings of a vehicle captured by an in-vehicle camera to a center outside the vehicle. The transmitted image is composed of a plurality of time series images. A frequency of transmission of the image is changed based on a level of difficulty of safe driving, and the image is transmitted at a high frequency when the difficulty is high. In addition, P2011-221686A is exemplified as documents showing the technical level in the technical field of the present disclosure at the time of applying.

SUMMARY

An image transmission system which generates one piece of composite image data by combining a plurality of pieces of image data captured by a plurality of cameras and transmits the composite image data to a remote place is considered. Each camera continuously captures an image at a predetermined period and generates a captured image. The image transmission system sequentially acquires the respective captured image data continuously generated, combines the plurality of pieces of captured image data, and transmits the combined data to the remote place. At this time, acquisition failure of a piece of image data may occur due to delay in processing or the like. Therefore, it is necessary to appropriately set timing of data transmission.

If the image transmission system transmits respective image data to the remote place individually without combining them, the timing of data transmission is not a matter. That is, in this case, even if acquisition failure of a piece of image data occurs, the piece of image data may not be transmitted but transmission of other pieces of image data of which acquisition failure does not occur is not affected. However, in a system which combines a plurality of pieces of captured image data and then transmits the combined data to the remote place like the image transmission system according to the present embodiment, stopping transmitting one piece of composite image data means that stopping transmitting all of the captured image data included in the composite image data. Therefore, it is required to appropriately set the timing of data transmission.

One object of the present disclosure is to provide a technique capable of appropriately setting timing of data transmission in a system which combines a plurality of pieces of image data captured continuously into one piece of combined image data and then transmits the combined image data to the remote place.

The first aspect of the present disclosure relates to an image transmission system including a plurality of cameras and a communication device. The communication device is configured to execute the following processes. The first process is sequentially acquiring captured image data from each of the plurality of cameras. The second process is generating composite image data by combining the captured image data last acquired from each of the plurality of cameras, each time acquiring the captured image data from a main camera that is one of the plurality of cameras. The third process is transmitting the composite image data to a target terminal.

The second aspect of the present disclosure relates to an image transmission method. The image transmission method includes sequentially acquiring a captured image data from each of a plurality of cameras, generating composite image data by combining the captured image data last acquired from each of the plurality of cameras, each time acquiring the captured image data from a main camera that is one of the plurality of cameras, and transmitting the composite image data to a predetermined terminal.

The third aspect of the present disclosure relates to a non-transitory computer-readable storage medium storing a program. The program is configured to cause a computer to execute the image transmission method according to the second aspect.

According to the present disclosure, in a system which combines a plurality of pieces of image data acquired continuously into one piece of image data and then transmits the combined image data to a remote place, it is possible to appropriately set timing of data transmission.

DETAILED DESCRIPTION

Embodiments of the present disclosure will be described with reference to the accompanying drawings.

1. Overview

Figure 1:
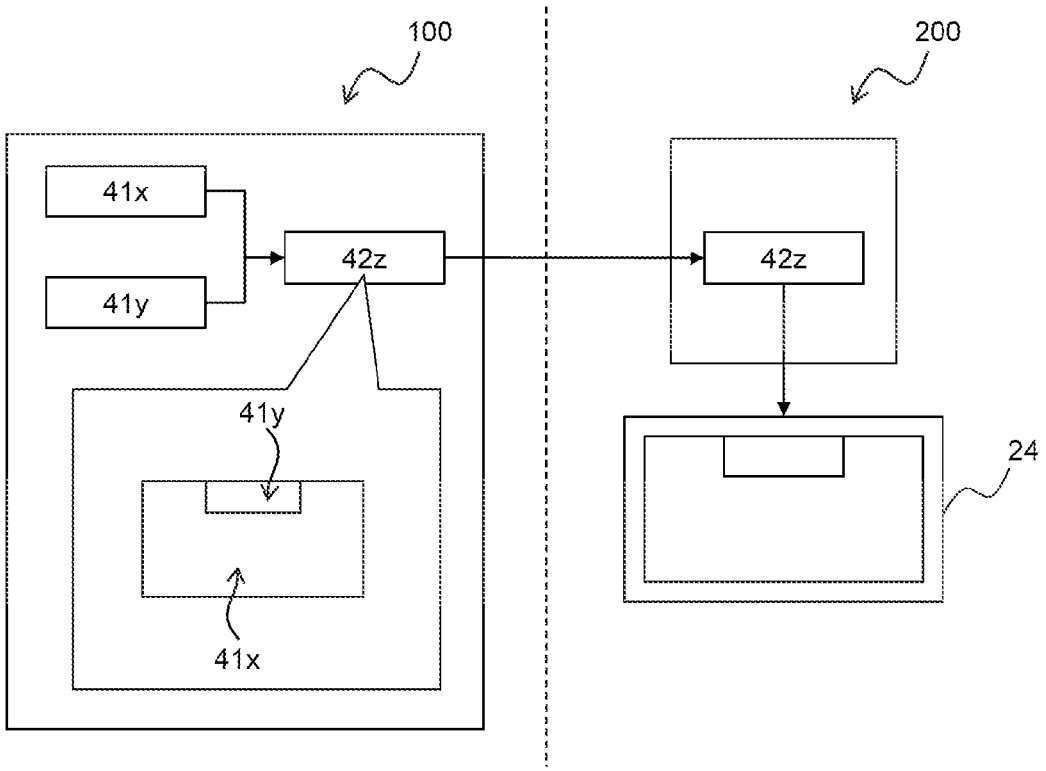
FIG. 1 is a diagram for explaining an overview of image transmission according to an embodiment of the present disclosure.

FIG. 1 is a diagram for explaining an overview of processing relating to image transmission performed by an image transmission system 100 according to the present embodiment. The image transmission system 100 is configured to be able to communicate with a target terminal 200 via a network and transmits data of an image to the terminal 200. The data transmitted from the image transmission system 100 to the terminals 200 includes composite image data 42z. The composite image data 42z is image data obtained by combining a plurality of pieces of captured image data 41x and 41y. The plurality of pieces of captured image data 41x and 41y are image data respectively captured by different cameras continuously capturing surroundings at a predetermined period and are sequentially acquired by the image transmission system 100.

Hereinafter, as a reference sign representing captured image data, a reference sign 41x or 41y is used for identifying one piece of captured image data, but a reference sign 41 is used for referring to an arbitrary piece of captured image data or generically referring to the captured image data. Further, as a reference sign representing composite image data, a reference sign 42z is used for identifying one piece of composite image data, but a reference sign 42 is used for referring to an arbitrary piece of composite image data or generically referring to the composite image data.

The captured image data 41 may be acquired from, for example, an in-vehicle camera mounted on a vehicle.

The composite image data 42 transmitted from the image transmission system 100 to the terminal 200 is displayed on a display 24 of the terminal 200. In a case where the plurality of pieces of captured image data 41 are acquired from the in-vehicle cameras, a remote terminal for performing remote support of the vehicle is exemplified as the terminal 200. In this case, for example, it is assumed that an operator who performs the remote support of the vehicle monitors the composite image data 42 displayed on the display 24 and performs the remote support of the vehicle using the remote terminal 200.

The composite image data 42 is generated by combining the plurality of pieces of the captured image data 41 in accordance with a display area of the display 24. Generation of the composite image data 42 is performed by, for example, a picture-in-picture (PIP) process. In the PIP process, on a partial area of one of the plurality of pieces of captured image data 41, a part of or all of each of the other pieces of image data is superimposed to combine the image data. For example, in FIG. 1, the captured image data 41x is used as a base image, and the composite image data 42z is generated by superimposing the captured image data 41y on a partial area of the captured image data 41x.

The number of the pieces of captured image data 41 used for generating the composite image data 42 is plural but it is not particularly limited. In like manner, in a case where the number of the pieces of captured image data 41 is three or more, generation of the composite image data 42 may be performed by the PIP process.

According to the present embodiment, each piece of the captured image data 41 is not transmitted to the terminal 200 independently, but the plurality of pieces of captured image data 41 are combined by the image transmission system 100, and the composite image data 42 is transmitted to the terminal 200. By transmitting the composite image data 42 to the terminal 200 after combining the plurality of pieces of captured image data 41 into the composite image data 42, it is possible to reduce an amount of transmitted data and to reduce a load on the network. In addition, in a case where the generation of the composite image data 42 is performed by the PIP process, the captured image data 41 to be superimposed can be compressed or an overlapped portion of the captured image data 41 can be deleted when the composite image data 42 is generated. Therefore, the amount of the data transmitted from the image transmission system 100 to the terminal 200 can be further reduced.

The plurality of pieces of captured image data 41 are continuously acquired by different cameras respectively. Therefore, the acquired captured image data 41 need to be continuously transmitted to the terminal 200. If the respective captured image data 41 are separately transmitted to the terminal 200, it is supposed that every time any captured image data 41 is acquired from the camera, the image transmission system 100 transmits the captured image data 41 to the terminal 200. However, in a case where the plurality of pieces of captured image data 41 are transmitted to the terminal 200 after being combined, all captured image data 41 are simultaneously transmitted to the terminal 200 as the composite image data 42. Therefore, it is necessary to appropriately set timing of combining and transmitting the captured image data 41. Hereinafter, the timing at which the image transmission system 100 according to the present embodiment combines and transmits the captured image data 41 is described.

2. Example of Configuration

Figure 2:
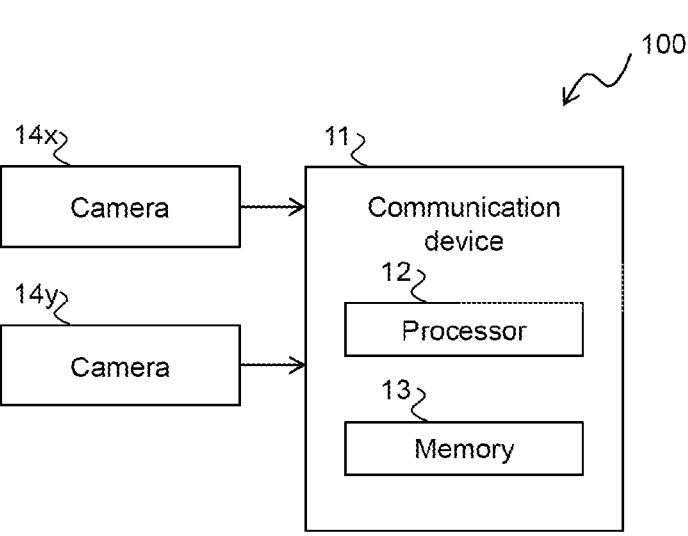
FIG. 2 is a block diagram showing an example of a configuration of an image transmission system.

Here, an example of configurations of the image transmission system 100 and the terminal 200 is described with reference to FIGS. 2 to 4. FIG. 2 is a block diagram showing the example of the configuration of the image transmission system 100. The image transmission system 100 includes a communication device 11 and a plurality of cameras 14x and 14y. The communication device 11 and the cameras 14x and 14y are connected to each other via a predetermined network. Hereinafter, as a reference sign representing a camera, a reference sign 14x or 14y is used for identifying one camera, but a reference sign 14 is used for referring to an arbitrary camera or generically referring to the cameras.

The communication device 11 is a device for transmitting data to the terminal 200. The communication device 11 performs wireless communication with the terminal 200. The communication with the terminal 200 may be performed via a base station on a network or may be performed directly. Examples of a communication standard of this wireless communication include 4G, LTE, and 5G.

The communication device 11 includes at least one processor 12 (hereinafter, referred to as a processor 12 or processing circuitry 12) and at least one memory 13 (hereinafter, simply referred to as a memory 13). The processor 12 includes a central processing unit (CPU). The memory 13 is a volatile memory such as a DDR memory, and loads various programs executed by the processor 12 and temporarily stores various data. The various data includes the captured image data 41, the composite image data 42, layout information, information about a main camera, which is described below, and the like.

The layout information is information relating to a layout of the captured image data 41 and used for generating the composite image data 42 from the plurality of pieces of captured image data 41. The layout information may be stored in the memory 13 in advance or may be acquired from the terminal 200 via the communication before the generation of the composite image data 42.

The processor 12 performs various kinds of data processing by executing a program for predetermined data processing stored in the memory 13. The data processing performed by the processor 12 includes processing for acquiring the captured image data 41, processing for generating the composite image data 42, processing for transmitting the data to the terminal 200, and the like.

The camera 14 is a camera for capturing an image of the surroundings and acquiring captured image data 41. The number of the cameras 14 is plural but is not particularly limited. For example, FIG. 2 shows two cameras 14x and 14y. Each of the plurality of cameras 14 transmits the captured image data 41 obtained by capturing the surroundings to the communication device 11.

The camera 14 may be the in-vehicle camera. FIG. 3 shows an example where the camera 14 is the in-vehicle camera. FIG. 3 shows cameras 14a, 14b, 14c, 14d, 14f, 14g, 14i, and 14j (cameras 14) and composite image data 42e (composite image data 42). Each area represented by a broken line shows an area captured by each camera 14. In the example of FIG. 3, captured image data 14a, 14b, 14c, and 14d respectively captured by the in-vehicle cameras 41a, 41b, 41c, and 41d are combined to generate the composite image data 42e. The camera 14a is a front camera, which captures a forward image as seen from a vehicle VE. The camera 14b is a rear camera, which captures a backward image as seen from the vehicle VE. The camera 14c is a left side camera, which captures a left side lateral image as seen from the vehicle VE. The camera 14d is a right side camera, which captures a right side lateral image as seen from the vehicle VE. The composite image data 42e is generated by the PIP process. The captured image data 41a acquired from the camera 14a is used as the base image and portions of the image data 41b, 41c, and 41d is superimposed on the captured image data 41a. When the composite image data 42e is generated, a size and arrangement of the respective captured image data 41 are determined based on the layout information.

Hereinafter, a camera 14 which acquires captured image data 41 which is used as the base image when the composite image data 42 is generated by the PIP process is referred to as a base camera. In the example of FIG. 3, the camera 41a, which acquires the captured image data 41a, is the base camera. The layout information may include information about the base camera.

The image transmission system 100 may generate a plurality of pieces of composite image data 42. For example, in addition to the composite image data 42e, composite image data 42h may be generated from captured image data 41f and 41g, which are respectively acquired from the cameras 14f and 14g, and composite image data 42k may be generated from captured image data 41i and 41j, which are respectively acquired from the cameras 14i and 14j.

Figure 3:
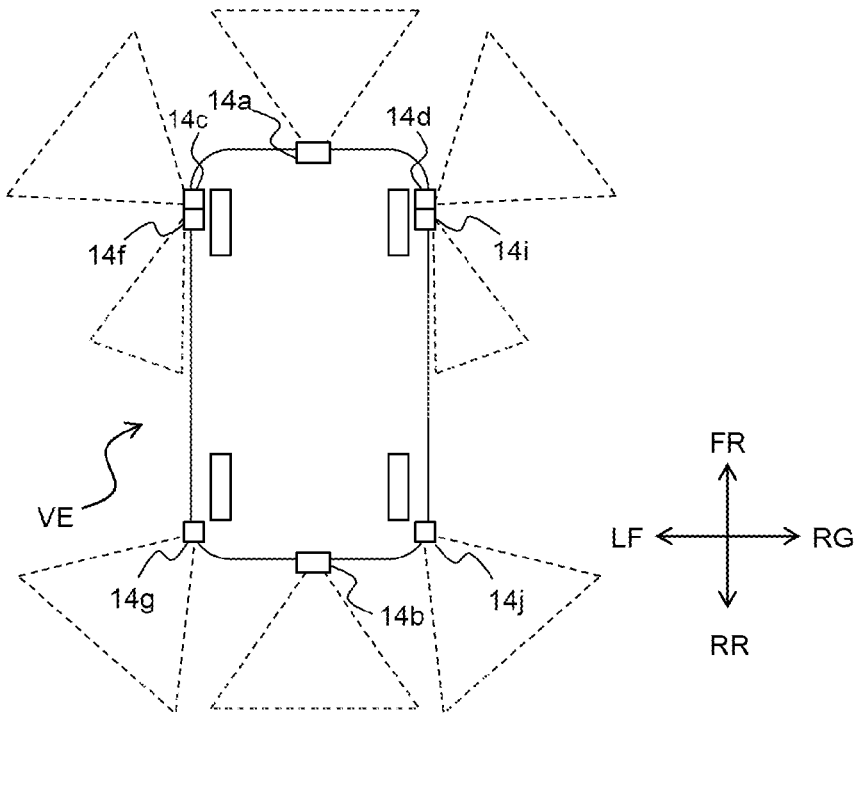
FIG. 3 is a diagram for explaining an example of cameras and composite image data.
Figure 3:
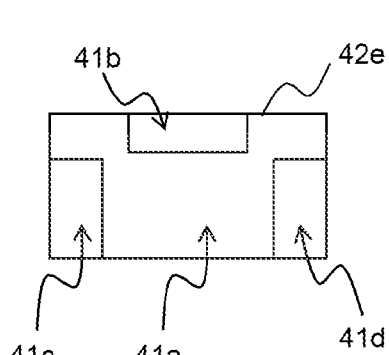

Further, in a case where the camera 14 is the in-vehicle camera as in the example of FIG. 3, the communication device 11 may be connected to various sensors mounted on the vehicle VE via a predetermined network. Examples of the various sensors include a vehicle state sensor such as a speed sensor, an acceleration sensor, a yaw rate sensor, a steering angle sensor, and a gear position sensor. By communicating with these sensors, the communication device 11 can acquire information about a state of the vehicle such as a speed, an acceleration, a yaw rate, a steering angle, and a gear position.

Figure 4:
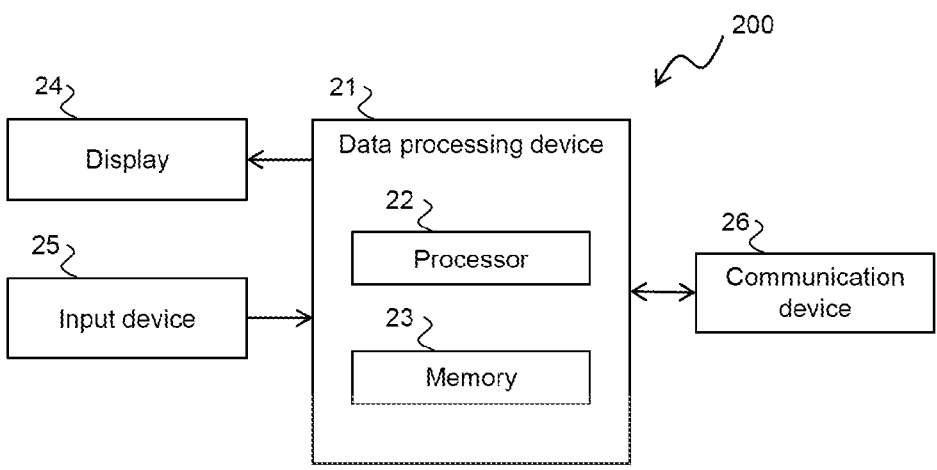
FIG. 4 is a block diagram showing an example of a configuration of a terminal.

FIG. 4 is a block diagram showing an example of the configuration of the terminal 200. The terminal 200 includes a data processing device 21, a display 24, an input device 25, and a communication device 26. The display 24, the input device 25, and the communication device 26 are connected to the data processing device 21 via a predetermined network.

The data processing device 21 is a computer which performs data processing based on various data stored in the terminal 200 and various data acquired by the terminal 200. The data processing device 21 includes at least one processor 22 (hereinafter, simply referred to as a processor 22 or processing circuitry 22) and at least one memory 23 (hereinafter, simply referred to as a memory 23). The processor 22 performs various kinds of data processing by executing a predetermined program for data processing stored in the memory 23. The processor 22 includes a CPU. The memory 23 is a volatile memory such as a DDR memory. The memory 23 loads various programs executed by the processor 22 and temporarily stores various data.

The display 24 displays the composite image data 42 received from the image transmission system 100 for a user of the terminal 200. When the camera 14 is the in-vehicle camera, the terminal 200 may be the terminal for performing the remote support of the vehicle VE. In this case, the operator who performs the remote support is assumed as the user of the terminal 200 and the composite image data 42 displayed on the display 24 is monitored by the operator.

The remote support performed by the operator includes remote driving. In the remote driving, the operator performs driving operations of the vehicle VE including steering, acceleration, deceleration, and the like with reference to the composite image data 42 displayed on the display 24.

The input device 25 is operated by the user of the terminal 200. The input device 25 includes an input unit operated by the user such as a mouse, a keyboard, a button, or a switch. In a case where the terminal 200 is a terminal for performing the remote support of the vehicle VE, the input device 25 is operated by the operator. In a case where the operator remotely drives the vehicle VE, the input device 25 may include an input device for driving. Examples of the input device for driving include a steering wheel, a shift lever, an accelerator pedal, and a brake pedal. In addition to these, the user of the terminal 200 may input an instruction for changing a setting of a main camera, which is described below, into the input device 25.

The communication device 26 performs wireless communication with at least the image transmission system 100. The communication device 26 can receive the data from the image transmission system 100 via the wireless communication. The communication device 26 can also generate instruction information based on an operation input to the input device 25 by the user of the terminal 200 and transmit the instruction information to the image transmission system 100. In a case where the terminal 200 performs the remote support or the remote driving of the vehicle VE, the instruction information includes information relating to the remote support or the remote driving. The instruction information may include an instruction relating to the setting of the main camera described below.

3. Flow of Data Processing

Figure 5:
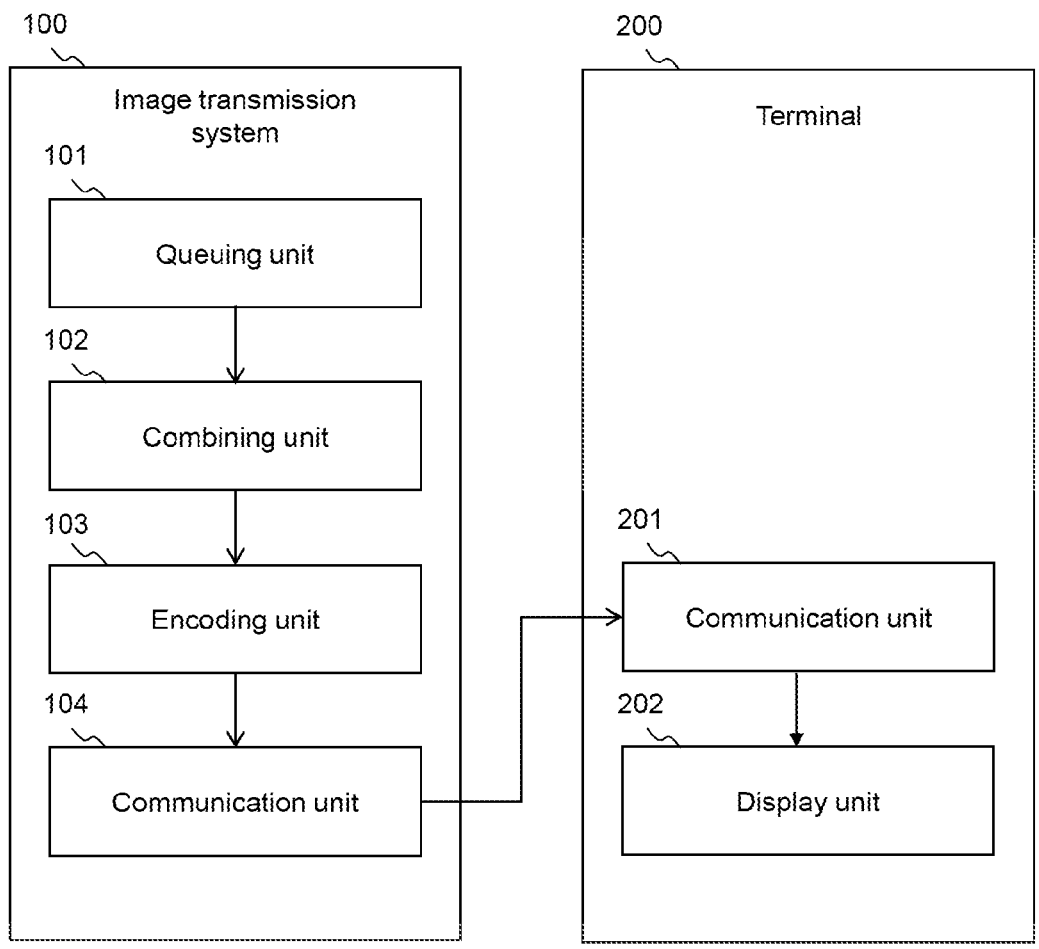
FIG. 5 is a block diagram showing an example of a functional configuration of the image transmission system and the terminal.

An example of functional blocks included in the image transmission system 100 and the terminal 200 and a flow of data processing is described with reference to FIG. 5.

The image transmission system 100 includes a queuing unit 101, a combining unit 102, an encoding unit 103, and a communication unit 104. These functional blocks are realized by the processor 12 executing the program stored in the memory 13.

In the flow of data processing performed by the image transmission system 100, first, various data are acquired by the queuing unit 101. These various data include the captured image data 41 obtained by each camera 14 capturing the surroundings. Each camera 14 sequentially acquires the captured image data 41 and sequentially transmits the acquired captured image data 41 to the queuing unit 101. The queuing unit 101 sequentially acquires the captured image data 41 transmitted from each camera 14.

When the processor 12 determines that transmission timing has come, the plurality of pieces of captured image data 41 is transmitted from the queuing unit 101 to the combining unit 102. Among the plurality of pieces of captured image data 41, the captured image data 41 which generate the same composite image data 42 are transmitted to the combining unit 102 at the same timing. The transmission timing is described below.

The combining unit 102 combines the plurality of pieces of captured image data 41 to generate the composite image data 42. When the composite image data 42 is generated, a position and a size of each piece of captured image data 41 are specified based on layout data. The composite image data 42 generated by the combining unit 102 is transmitted to the encoding unit 103. When the combining unit 102 receives the captured image data 41 from the queuing unit 101, the composite image data 42 is sequentially generated and the generated composite image data 42 is sequentially transmitted to the encoding unit 103.

The encoding unit 103 performs an encoding process of the composite image data 42. In the encoding process, the composite image data 42 may be compressed. When the encoding unit 103 receives the composite image data 42 from the combining unit 102, the encoding process is sequentially performed, and the composite image data 42 of which the encoding process is performed is sequentially transmitted to the communication unit 104. The communication unit 104 communicates with the terminal 200 and sequentially transmits the composite image data 42 received from the encoding unit 103 to the terminal 200.

The terminal 200 includes a communication unit 201 and a display unit 202. These functional blocks are realized by the processor 22 executing the program stored in the memory 23.

The communication unit 201 communicates with the image transmission system 100 and sequentially receives the composite image data 42 transmitted from the image transmission system 100. The received composite image data 42 is sequentially transmitted to the display unit 202.

The display unit 202 performs a decoding process of the acquired composite image data 42 and sequentially displays the composite image data 42 on the display 24. In a case where the composite image data 42 is compressed by the encoding unit 103, the data is expanded by the display unit 202.

By the combining unit 102 and the functional units which work after the combining unit 102, processing is sequentially performed when the data is input, and the data generated as a result of the processing is sequentially transmitted to the next functional unit. That is, the transmission timing of the captured image data 41 from the queuing unit 101 to the combining unit 102 determines timing of combining and transmitting the captured image data 41. The transmission timing is determined by the processing performed by the queuing unit 101.

4. Example of Processing Flow

Figure 6:
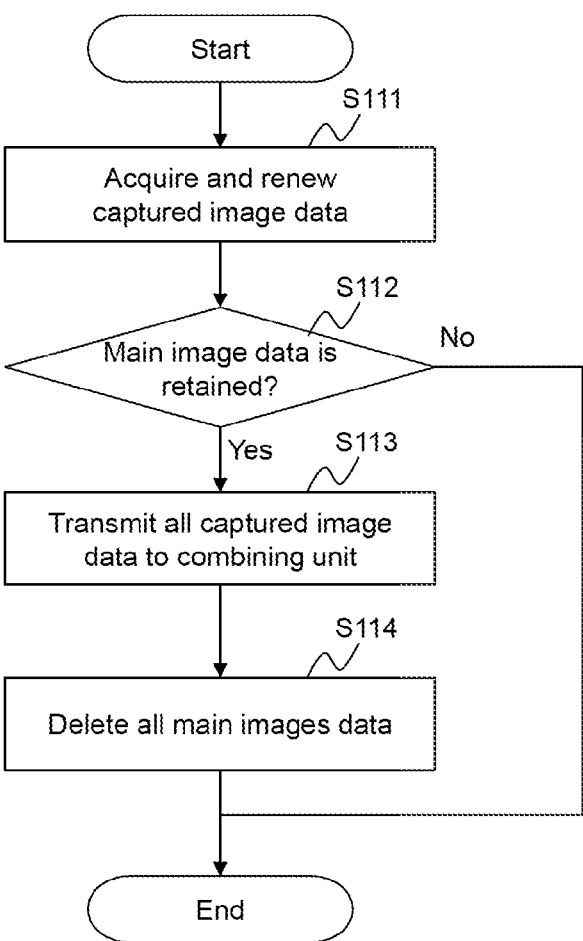
FIG. 6 is a flowchart showing an example of processing performed by a queuing unit.

FIG. 6 is a flowchart showing an example of processing performed by the queuing unit 101. The processing shown in FIG. 6 is realized by the processor 12 executing the program stored in the memory 13.

When the captured image data 41 is transmitted from any one of the cameras 14 to the image transmission system 100, a series of processing is started. In Step S111, the processor 12 acquires the captured image 41 transmitted from the camera 14. The acquired captured image data 41 is retained in the queuing unit 101 until the transmission timing comes. If a previous captured image data 41 acquired from the same camera 14 is already retained in the queuing unit 101, the previous captured image data 41 is renewed to the newly acquired captured image data 41.

In Step S112, the processor 12 determines whether main image data is retained in the queuing unit 101 or not. If the main image data is retained (Step S112; Yes), the processing proceeds to Step S113. If the main image data is not retained (Step S112; No), the processing ends.

The main image data is captured image data from which the user of the terminal 200 is considered to obtain the most information among the plurality of pieces of captured image data 41 used for generating the composite image data 42. The main image is described below.

In Step S113, the processor 12 transmits all captured image data 41 used for generating one piece of composite image data 42 from the queuing unit 101 to the combining unit 102. In other words, timing at which the process of Step S113 is performed is the transmission timing. The captured image data 41 last acquired from each camera 14 is transmitted to the combining unit 102. The transmitted captured image data 41 is then used for the generation of the composite image data 42 by the composition unit 102, and the composite image data 42 is transmitted to the terminal 200.

In Step S114, the processor 12 deletes all main images data retained in the queuing unit 101. After the main image data is deleted, the processing ends.

As shown in the series of processing, according to the present embodiment, the timing at which the main image data is acquired is set as the transmission timing. Hereinafter, a camera 14 which acquires the main image data is referred to as a main camera. The main image data and the main camera is described in detail.

Information amounts obtained by the user of the terminal 200 from the plurality of pieces of captured image data 41 included in the composite image data 42 are not necessarily the same for all pieces of captured image data 41. For example, as in the example of FIG. 3, a case is considered in which the cameras 14 are the in-vehicle cameras mounted on the vehicle VE and the user of the terminal 200 is the operator of the remote support. When the vehicle VE is traveling forward, the operator of the remote support is normally considered to obtain the most information from the front camera 14*a*. In this way, considering that the information amounts obtained from respective captured image data 41 by the user are different, the main camera is set to one camera for one piece of the composite image data 42. By setting one main camera, the main image data is also determined to be one piece of captured image data 41 among the plurality of pieces of the captured image data 41 used for generating one piece of composite image data 42.

An example of a method of setting the main camera is described. In a first example, the main camera is fixed to a specific camera determined in advance. In some embodiments, the main camera may be set to any camera, but when the composite image data 42 is generated by the PIP process, the base camera is set as the main camera. In this case, the captured image data 41 used as data of a base image becomes the main image data. Since information most necessary for the user of the terminal 200 is obtained from the base camera in many cases, it is appropriate to set the base camera as the main camera.

In the second example, the main camera is changed according to a situation. For example, in a case where the cameras 14 are the in-vehicle cameras of the vehicle VE, the camera 14 from which the user of the terminal 200 obtains a particularly large amount of information may vary depending on the situation. For example, the user may obtain a large amount of information from the front camera 14a when the vehicle VE is traveling forward or from the rear camera 14b when the vehicle VE is traveling backward. Therefore, in the second example, the main camera is changed according to the situation. In this case, for example, it is assumed that a camera facing a traveling direction of the vehicle VE is set as the main camera. For example, it is assumed that the main camera is set to the front camera 14a when the vehicle VE is traveling forward, is set to the rear camera 14b when the vehicle VE is traveling backward, and is set to the left camera 14c when the vehicle VE is turning left. The processor 12 can determine the traveling direction of the vehicle VE by acquiring information from the gear position sensor, the speed sensor, and the acceleration sensor of the vehicle VE and can set the main camera based on the result of determination, for example.

In the third example, the main camera can be changed to an arbitrary camera 14. However, in the third example, the main camera is set by the user of the terminal 200. In this case, for example, the user inputs an instruction to the input device 25 about which camera 14 is set as the main camera, and the result of the instruction is transmitted from the terminal 200 to the image transmission system 100. The image transmission system 100 sets the camera 14 selected by the user as the main camera based on the result of the instruction.

The fourth example is a combination of the second example and the third example. In the fourth example, the main camera may be set to be changeable in accordance with the situation of the vehicle VE and may also be changed in accordance with an instruction from the user when the instruction is given by the user.

5. Time Chart

Figure 7:
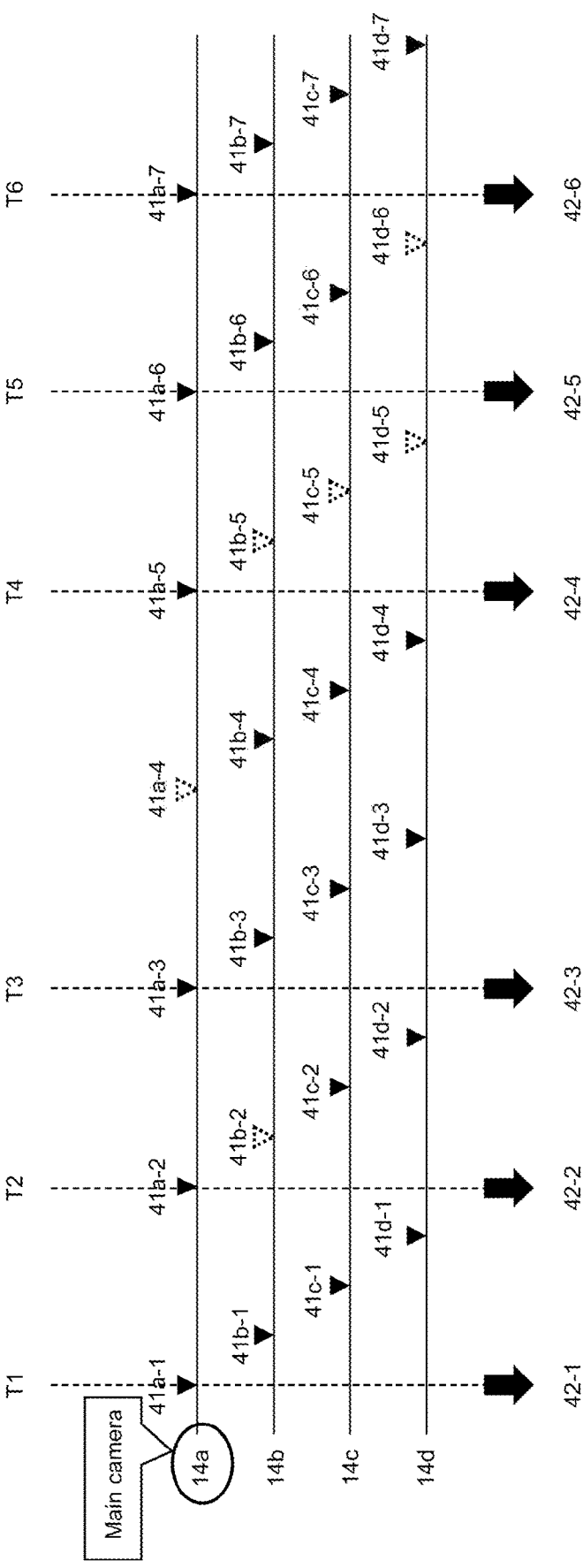
FIG. 7 is a time chart showing transmission timing according to the embodiment of the present disclosure.

FIG. 7 is a time chart showing the transmission timing according to the present embodiment. In the following description, as an example, a case is assumed in which the composite image data 42 is generated from the image data 41a, 41b, 41c, and 41d respectively acquired from the cameras 14a, 14b, 14c, and 14d. The camera 14a is set as the main camera. The main image data is the captured image data 41a.

As shown in FIG. 7, the captured image data 41 is transmitted from each camera 14 at a predetermined period and is sequentially acquired by the queuing unit 101. The period of acquiring the captured image data 41 may be the same for all cameras 14 or may be different for respective cameras 14. The timings at which respective captured image data 41 are acquired may be the same or may be different for respective cameras 14. In the example of FIG. 7, the period of acquiring the captured image data 41 is the same for the four cameras 14. In FIG. 7, a number representing a period is added to the reference sign for each piece of captured image data 41.

According to the present embodiment, the transmission timing is determined based on whether the captured image date 41a, which is the main image date, is acquired or not. Regarding the captured image data 41 transmitted from respective cameras 14, acquisition failure may occur due to a delay in processing by the processor 12 or the like. For example, regarding the cameras 14b, 14c, and 14d, captured image data 41b-5, 41c-5, and 41d-5, which should be acquired in the fifth period, are failed to be acquired. According to the present embodiment, even when all captured image data 41 except for the main image data are failed to be acquired, time T5 at which the main image data 41a-6 is acquired is determined as the transmission timing.

If any captured image data 41 is failed to be acquired, the previous data, that is, the latest captured image data 41 which has been acquired is used for generating the composite image data 42. For example, at time T5, the previous captured image data 41b-4, 41c-4, and 41d-4 are used instead of the captured image data 41b-5, 41c-5, and 41d-5, which are failed to be acquired, for generating the composite image date 42-5.

Regarding the main camera 14a, captured image data 41a-4 which should be acquired in the fourth period is failed to be acquired. According to the present embodiment, in such a case, the composite image data 42 is not generated until the captured image data 14a is acquired from the main camera 41a.

At the transmission timing, respective captured image data 41 are transmitted to the combining unit 102 after renewed to the latest captured image data 41 which has been acquired. From time when the captured image data 41b-3, 41c-3, and 41d-3 are acquired to time T4 which is determined as the transmission timing, captured image data 14b-4, 14c-4, and 14d-4 are newly acquired from the same cameras 41b 14c, and 14d. Therefore, the captured image data 41b-3, 41c-3, and 41d-3 are not transmitted to the combining unit 102, and instead, the renewed captured image data 41b-4, 14c-4, and 14d-4 are transmitted to the combining unit 102.

6. Comparative Example

Figure 8:
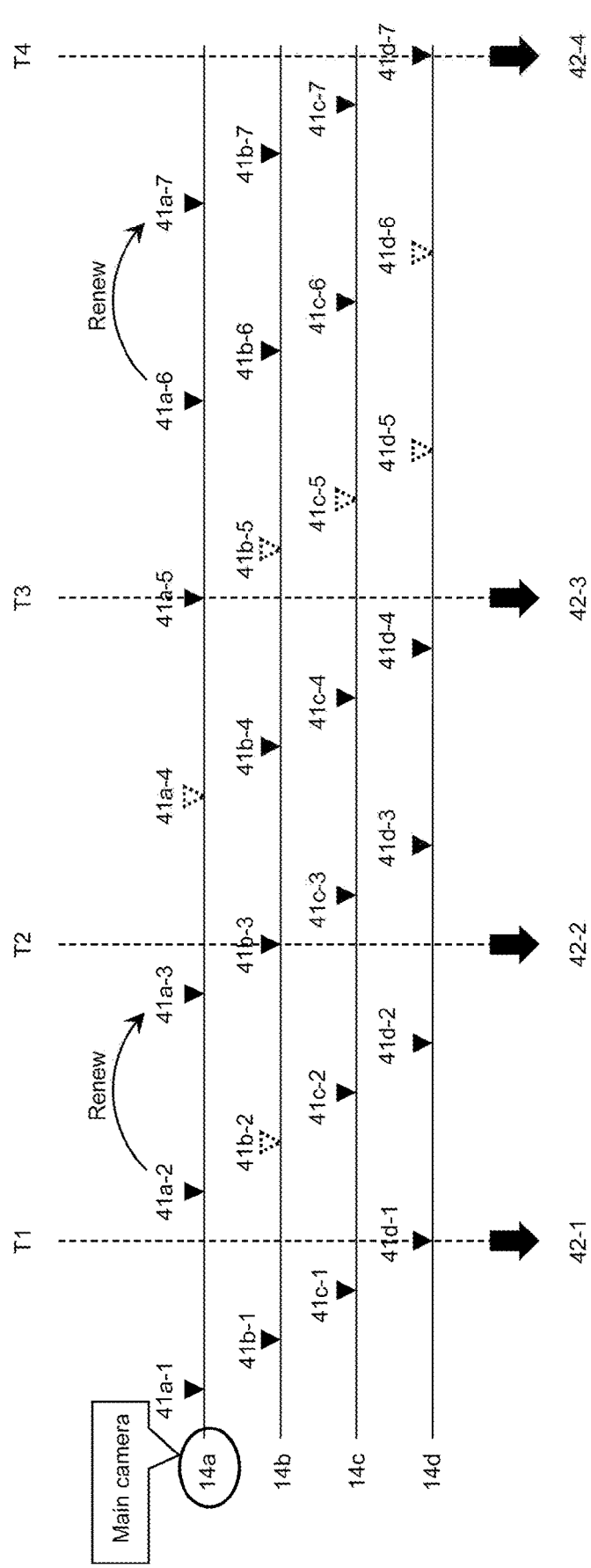
FIG. 8 is a time chart showing the transmission timing in a comparative example.

As comparative examples, two typical methods for determining the transmission timing are described. FIG. 8 is a time chart showing the transmission timing in the first comparative example.

In the example of FIG. 8, the transmission timing is timing at which the captured image data 41 are newly acquired from all cameras 14. For example, since the latest captured image data 41a-1, 41b-1, 41c-1, and 41d-1 are acquired, the processor 12 determines that the transmission timing has come at time T1.

After time T1, regarding to the camera 41b, captured image data 14b-2, which should be acquired in the second period, is failed to be acquired. Therefore, the next transmission timing is determined to be time T2 at which captured-image data 41b-3 are newly acquired from the camera 14b.

The captured image data 41a-2 acquired from the camera 41a is renewed to the captured image data 41a-3, which is newly acquired in the next period. That is, the captured image data 41a-2 acquired from the camera 14a in the second period is not used for generating the composite image data 42 and is not transmitted to the terminals 200. Therefore, for the user of the terminal 200, the transmission of the main image data is delayed by one period.

Further, captured image data 41b-5, 41c-5, and 41d-5 are failed to be acquired in the fifth period, and captured image data 41d-6 are failed to be acquired in the sixth period. Therefore, the composite image data 42 is not generated until time T4 at which the latest captured image 41 are acquired from all cameras 14.

In this case, the captured image data 41a-6 acquired from the main camera are renewed to newly acquired captured image data 41a-7. That is, the captured image data 41a-6 is not used for generating the composite image data 42 and is not transmitted to the terminals 200. For the user of the terminal 200, the transmission of the main image data is delayed by one period.

As described above, in the comparative example of FIG. 8, if the acquisition failure of any captured image data 41 except for the main image data occurs, the transmission of the main image data is delayed. In some embodiments, for the user of the terminal 200, since the main image data is the most important data, it is not desirable that a delay occurs in the transmission of the main image data.

In contrast, according to the present embodiment, when the main image data is acquired, the composite image data 42 is generated and transmitted to the terminal 200 regardless of whether the other captured image data 41 are acquired or not. Therefore, in the transmission to the terminal 200, the delay of the main image data can be prevented. For the user of the terminal 200, it is possible to obtain the important information without missing it.

Figure 9:
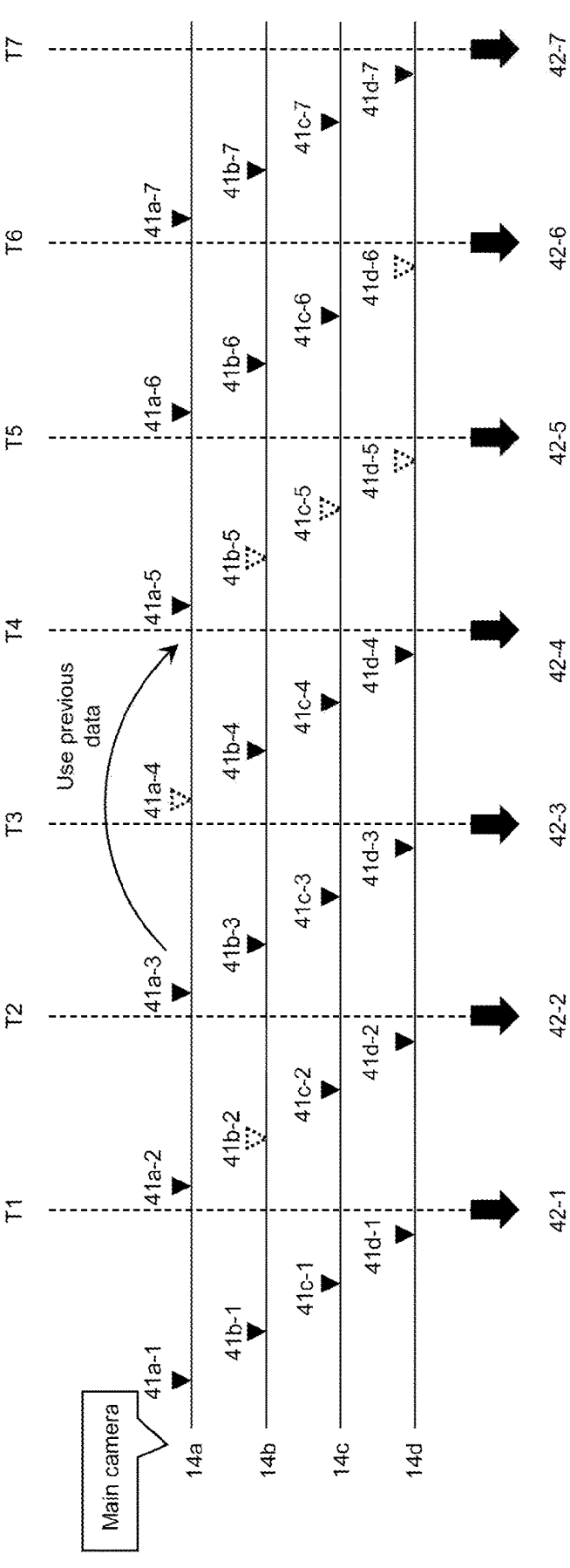
FIG. 9 is a time chart showing the transmission timing in another comparative example.

Next, a time chart of the second comparative example is shown in FIG. 9. In the second comparative example, the transmission timing comes at a predetermined period set in advance. In the example of FIG. 9, the predetermined period is set to equal to the period at which the captured image data 41 is acquired.

In this example, first, captured image data 41a-1, 41b-1, 41c-1, and 41d-1 are combined to generate the composite image data 42-1 at time T1. Then, the next composite image data 42-2 is generated at time T2 after a predetermined period from time T1. Further, the next composite image data 42-3 is generated at time T3 after a predetermined period from time T2. It is the same as time T4 and after time T4.

As in the case of the captured image date 41a-4, the main image date may be failed to be acquired in any period. In this case, the latest captured image data 41a-3 which has been acquired, that is, the previous captured image data 41a, is used for generating the composite image data 42.

In the second comparative example, even if the acquisition failure of any captured image data 41 occurs, the composite image data 42 is generated when the predetermined period elapses, and thus the delay of the main image data as in the first comparative example does not occur. However, when the acquisition failure of the main image data occurs, previous data is used for generating the composite image data 42. Therefore, the composite image data 42 displayed on the display 24 becomes data in which the main image data is delayed by one cycle, and when the main image data is taken notice of, quality of the composite image data 42 becomes lowered.

In contrast, in the present embodiment, the composite image data 42 is not generated when the acquisition failure of the main image data occurs. Therefore, the main image data used for generating the composite image data 42 does not become the previous data, and when the main image data is taken notice of, the quality of the composite image data 42 is guaranteed.

7. Summary

As described above, the image transmission system 100 according to the present embodiment combines the plurality of pieces of captured image data 41 acquired from the plurality of cameras 14 and transmits the composite image data 42 to the predetermined terminal 200. Regarding to the determination of the transmission timing at which the captured image data 41 is combined and transmitted, the main camera is set and the timing at which the main image data is acquired from the main camera is set as the transmission timing. When the main image data is acquired, the composite image data 42 is generated without waiting for the latest captured image data 41 to be acquired from the other cameras 14. Therefore, information particularly required by the user can be transmitted to the predetermined terminal 200 without failure. On the other hand, when the main image data is not acquired, the transmission is not performed. This ensures the quality of the main image data included in the composite image data 42. In addition, the frequency of transmission of unimportant data can be reduced, and it leads to a reduction of the load on the network.

What is claimed is:

1. An image transmission system comprising:
   a plurality of cameras; and
   a communication device configured to execute:
   sequentially acquiring captured image data from each of the plurality of cameras;
   generating composite image data by combining the captured image data last acquired from each of the plurality of cameras, each time acquiring the captured image data from a main camera that is one of the plurality of cameras; and
   transmitting the composite image data to a target terminal,
   wherein generating the composite image data includes superimposing a part of or all of the captured image data acquired from each of the plurality of cameras except for a base camera on a partial area of the captured image data acquired from the base camera, the base camera being one of the plurality of cameras.

2. The image transmission system according to claim 1, wherein the main camera is the base camera.

3. The image transmission system according to claim 1, wherein the communication device is further configured to execute:
   receiving an input for selecting one of the plurality of cameras; and
   setting the selected camera as the main camera.

4. The image transmission system according to claim 1, wherein
   the communication device is mounted on a vehicle, and
   the plurality of cameras is a plurality of in-vehicle cameras mounted on the vehicle.

5. The image transmission system according to claim 1, wherein the communication device is further configured to execute:
   receiving an input for selecting one of the plurality of cameras; and
   setting the selected camera as the main camera.

6. The image transmission system according to claim 1, wherein
   the communication device is mounted on a vehicle, and
   the plurality of cameras is a plurality of in-vehicle cameras mounted on the vehicle.

7. An image transmission method comprising:
   acquiring a captured image data from each of a plurality of cameras sequentially;
   generating composite image data by combining the captured image data last acquired from each of the plurality of cameras, each time acquiring the captured image data from a main camera that is one of the plurality of cameras; and transmitting the composite image data to a predetermined terminal, wherein generating the composite image data includes superimposing a part of or all of the captured image data acquired from each of the plurality of cameras except for a base camera on a partial area of the captured image data acquired from the base camera, the base camera being one of the plurality of cameras.

8. A non-transitory computer-readable storage medium storing a program configured to cause a computer to execute:

acquiring a captured image data from each of a plurality of cameras sequentially;

generating composite image data by combining the captured image data last acquired from each of the plurality of cameras, each time acquiring the captured image data from a main camera that is one of the plurality of cameras; and transmitting the composite image data to a predetermined terminal, wherein generating the composite image data includes superimposing a part of or all of the captured image data acquired from each of the plurality of cameras except for a base camera on a partial area of the captured image data acquired from the base camera, the base camera being one of the plurality of cameras.

\* \* \* \* \*